United States Patent [19]
Price

[11] Patent Number: 5,996,722
[45] Date of Patent: Dec. 7, 1999

[54] VEHICLE STEERING SYSTEMS

[76] Inventor: Richard David Price, Wern Farm, Usk Road, Pontypool, Gwent. NP4 8QX, United Kingdom

[21] Appl. No.: 08/930,780
[22] PCT Filed: Apr. 4, 1996
[86] PCT No.: PCT/GB96/00857
  § 371 Date: Oct. 6, 1997
  § 102(e) Date: Oct. 6, 1997
[87] PCT Pub. No.: WO96/31387
  PCT Pub. Date: Oct. 10, 1996

[30] Foreign Application Priority Data

Apr. 5, 1995 [GB] United Kingdom ............ 9507021

[51] Int. Cl.$^6$ ........................................ B62D 7/15
[52] U.S. Cl. ................... 180/403; 180/402; 180/410; 180/234
[58] Field of Search .................... 180/403, 408, 180/410, 411, 6.2, 6.28, 6.3, 6.44, 6.48, 402, 234

[56] References Cited

U.S. PATENT DOCUMENTS

| | | | |
|---|---|---|---|
| 3,490,555 | 1/1970 | Noack | 180/411 |
| 3,933,215 | 1/1976 | Scheuerle | 180/411 |
| 4,008,783 | 2/1977 | Hermann et al. | 180/411 |
| 4,373,603 | 2/1983 | Nelson . | |
| 4,798,393 | 1/1989 | Miura et al. . | |
| 4,823,899 | 4/1989 | Ron | 180/411 |
| 5,259,475 | 11/1993 | Butler . | |
| 5,288,091 | 2/1994 | Deschamps | 180/411 |
| 5,348,111 | 9/1994 | Williams et al. | 180/410 |
| 5,758,740 | 6/1998 | Park | 180/403 |

FOREIGN PATENT DOCUMENTS

| | | |
|---|---|---|
| 0 228 962 | 7/1987 | European Pat. Off. . |
| 0 404 422 | 12/1990 | European Pat. Off. . |
| 0 564 501 | 10/1993 | European Pat. Off. . |
| 0 625 302 | 11/1994 | European Pat. Off. . |
| 6-016147 | 1/1994 | Japan . |
| 2 182 005 | 5/1987 | United Kingdom . |
| 2 245 533 | 1/1992 | United Kingdom . |
| 2 271 749 | 4/1994 | United Kingdom . |
| WO93/13972 | 7/1993 | WIPO . |

*Primary Examiner*—Daniel G. DePumpo
*Attorney, Agent, or Firm*—Young & Thompson

[57] ABSTRACT

A tractor (1) has front wheels (2), rear wheels (3) and carries an implement (7, 10) by a linkage (8) or tows a trailer (11). The front wheels (2) are steered normally by a steering wheel (6). The rear wheels (3) can be held in fixed alignment or they can be steered in various selectable modes, being slaved to the front wheels. In one mode, they are turned in the opposite direction to the front wheels, to give a very tight turning circle. In another mode, they turn with the front wheels but to a lesser degree, governed by the tractor wheel base (A) and the distance (B) of this implement behind the tractor, to keep lateral forces on the implement to a minimum. There can be automatic changeover between modes of steering.

9 Claims, 7 Drawing Sheets

VEHICLE STEERING SYSTEMS

This invention relates to a vehicle steering system for agricultural and other vehicles using implements which overhang the wheel base of the vehicle.

Implements fall broadly into two classes, namely those that are simply trailed behind the prime mover (referred to as the tractor), and those that are carried on a raising linkage. The invention is primarily concerned with linkage mounted implement/tractor combinations, although it can have applications to trailed implements.

Linkage mounted implements have numerous advantages. They can be lifted out of the ground when not in use, and the linkage mechanism can be used for height and depth control and also for transferring at least some of the weight of the implements onto the tractor to increase tractive effort.

A disadvantage of linkage mounted implements is that when they are in the ground, the implement prevents easy steering of the vehicle, since conventional steering action on the tractor attempts to move the implement sideways in the ground in a turn. This force impairs steering and may damage the implement, tractor or attaching linkage. Implements held on linkages which operate out of the ground also suffer from excessive sway or yaw due to the acceleration imparted to them on turning with conventional steering.

Current practice is to use swinging joints when joining implement and tractor. These are a partial solution in that they allow a limited amount of steering motion, restricted by the clearance that has to be maintained between the implement and the tractor rear wheels. This requirement for clearance means that the transport width of the tractor unit must be increased compared with what is required using a rigid linkage. When the implement is raised the swinging motion must be limited for safe transport. Another disadvantage of swinging links is that the lateral movement that they can allow can often exacerbate the problems of yaw and sway when in the raised position.

U.S. Pat. No. 4,798,393 (Honda) describes a tractor with various modes of steering. Its first embodiment has steerable front and rear wheels. They are mechanically linked so that, when the steering wheel is turned through a small angle, the front and rear wheels all turn in the same direction, although not by the same amount, to give a crabbing motion. But when the steering wheel is turned through a large angle, the rear wheels turn in the opposite direction to the front wheels, to give a tighter turning circle than that with just front wheel steer.

Although reference is made at one point to the rear wheels being "substantially not steered" there appears to be no provision for them to be held rigid while just the front wheels are steered in the small angle mode. Also, the transition between the rear wheels pointing one way and then the other over a very small arc of turn of the steering wheel must give an extremely awkward steering characteristic. It is a very inflexible system and is not known to have been put into practice.

The second embodiment of the Honda patent also relies on an entirely mechanical connection between the front and rear wheels. There is a lever which can be operated to change the nature of the connection, in one mode causing the front and rear wheels to turn in opposite directions (for tight cornering) and in another mode for the rear wheels to turn in the same direction as the front wheels. The geometry is then such that the vehicle turning circle is centered on a line transversely through an implement carried or towed at the rear. This enables the implement to follow a straight path, with no undue lateral forces. However, it is uncertain that the system maintains this throughout the full range of adjustment of the steering wheel, and it is too inflexible to cope in the same way with different implements with a different relationship to the wheelbase of the vehicle.

It is the aim of this invention to provide a steering system of much greater flexibility, able to accommodate easily to different implements, and to offer true front wheel only steering.

According to the present invention there is provided a vehicle with at least front and rear wheel pairs, independent steering means for the front pair and the rear pair, means for hitching or carrying an implement at one end of the vehicle, a steering wheel, and electronic control means arranged to influence the effect of the steering wheel on the steering means, the control means being switchable into at least three modes and being programmable to govern the response of the steering means to the turning of the steering wheel according to data on the vehicle and the implements for the time being attached thereto, the three modes being:

(i) front or rear wheel steering, with a normally passive, non-steered pair held in a fixed alignment with respect to the vehicle, (ii) co-ordinated steering in which the front and rear pairs turn in opposite directions when the steering wheel is operated so that the trailing pair tracks the leading pair, and (iii) programmed steering in which the front and rear pairs turn in similar directions, but to different extents, when the steering wheel is operated, such that the centre of turn of the vehicle is on a line transversely through the working portion of the implement.

The first mode provides normal single axle steering, the second mode allows very tight turns to be made, and the third mode will have the effect of eliminating or at least minimising side thrust on the implement.

In mode (i) there may be provision for the passive, non-steered pair to be set skew to the normal longitudinal direction of the vehicle. The other pair is then steered about a median position parallel to the set of the passive pair, thereby providing a fourth mode of crab steering. However, turning the steered pair substantially further than the angled median position is generally impossible. The steered wheels will fairly soon encounter the vehicle chassis. Therefore, while the steered pair will normally be in sole control of steering over a limited arc spanning the median position, when that limit is exceeded, the control means can be arranged to cause the hitherto passive pair to be steered, augmenting the steering action of the primary steered pair.

The control means will preferably be arranged to change modes of steering from one mode to another in response to vehicle/implement conditions. For example, the control means can be arranged to change the steering from mode (ii) or mode (iii) to mode (i) when the vehicle attains a predetermined speed, and preferably the steering should be kept in mode (i) by the control means if the speed then falls below the predetermined level.

The control means could also be arranged to change the steering from mode (iii) to mode (ii) when the implement is taken out of use, and to change the steering back from mode (i) to mode (iii) when the implement is put back into use.

The control means could also have the facility to operate the steering in a hybrid of modes (i) and (iii), mode (i) being operable over a central arc, but the steering changing to mode (iii) when the steered pair turn beyond that arc.

However, although these automatic changeovers are convenient, it is sensible to have provision for the normally passive non-steered pair to be steered by a driver operated control working through the electronic control means independently of the programmed modes, so that the driver can over-ride the program if necessary. A useful adjunct of this would be the ability to adjust the degree of crabbing in the fourth mode while the vehicle was in motion.

The implement will generally be mounted to the tractor on a raising linkage with minimal sideways freedom of movement. This provides for depth control whilst in work and safe transport when raised. But the system is also useful with trailed vehicles.

For a better understanding of the invention, an embodiment will now be described, by way of example, with reference to the accompanying drawings, in which.

Figure 1:
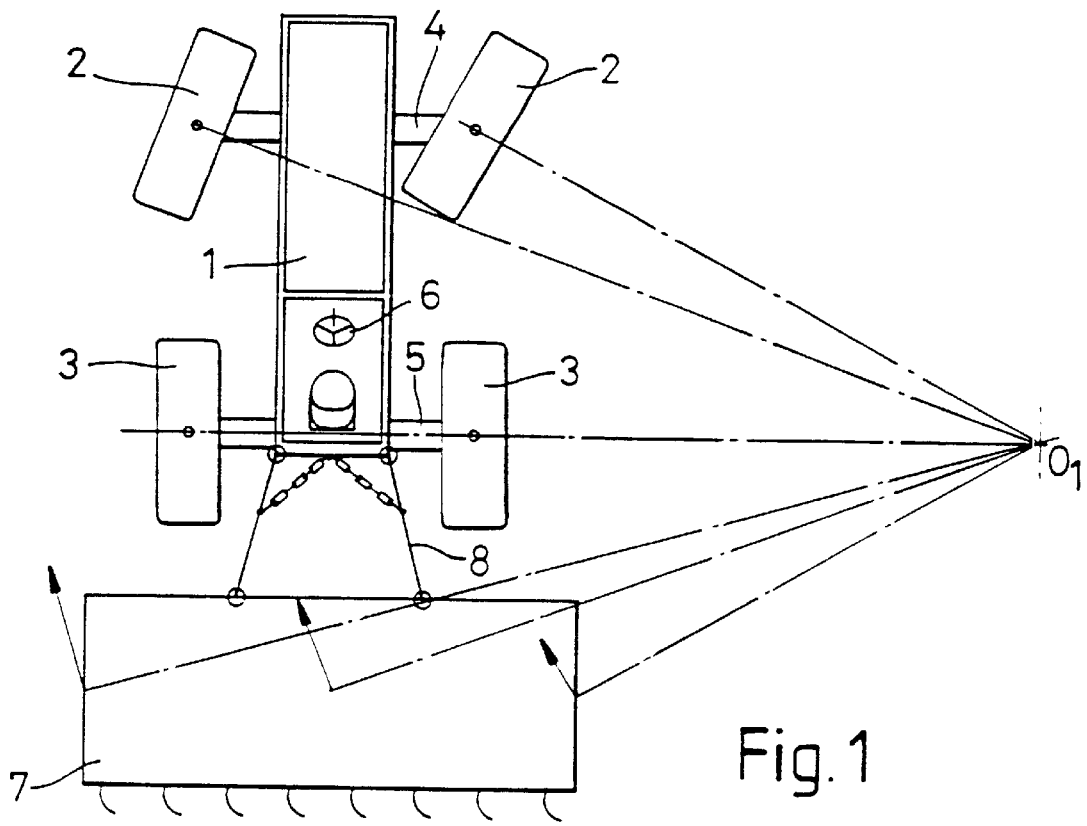
FIGS. 1 to 4 are diagrammatic plan views of a four wheeled tractor carrying an implement at the rear end each demonstrating a different steering mode.

The vehicle in the first figures to be described is a four wheeled tractor 1 having front wheels 2, rear wheels 3, and respective steering axles 4 and 5. There may be two wheel or four wheel drive. A steering wheel 6 controls the front axle steering of the vehicle in the normal manner and the rear axle is "slaved" (by means to be described later) to the front axle to operate in the selected mode. An implement 7 is carried at the rear on a linkage 8 which can raise and lower the implement. This is indicated as a swinging linkage by the diagrammatic restraining chains.

The distance between front and rear axles will be a fixed value A for any particular tractor (although different tractors will have other values of A), while the distance between the rear axle 5 and a line transversely through the working part of the implement 7 will be a value B which is likely to differ for different implements.

Figure 5:
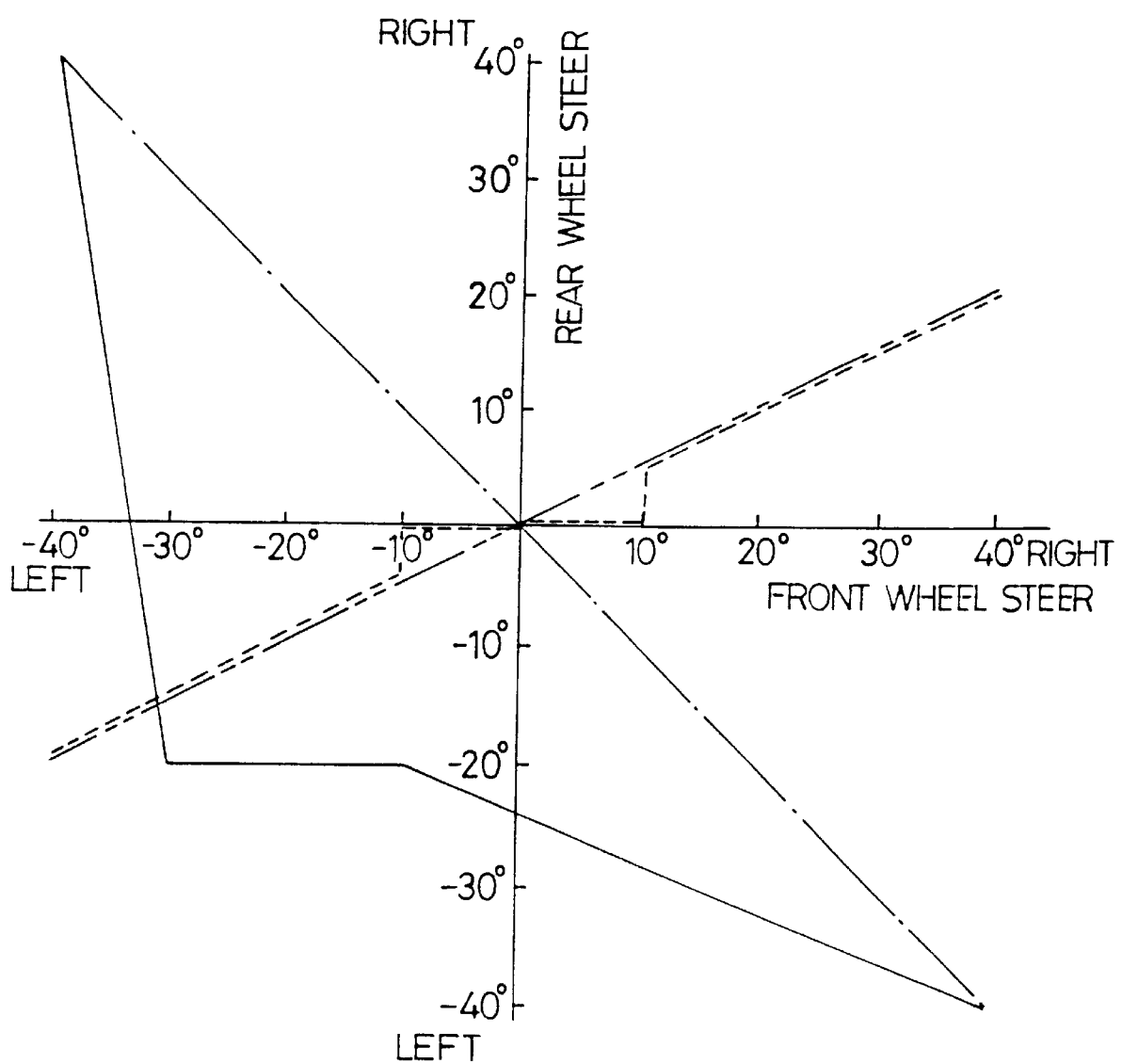
FIG. 5 is a graph for explaining the different modes.

FIG. 1 illustrates two wheel steering used for "normal" operation and road travel. With the turning circle centered at $O_1$ there is a resultant side force on the implement 7 especially if that is engaging the ground. The arrows indicate its path. In FIG. 5, the steering characteristic corresponds to the horizontal axis.

Figure 2:
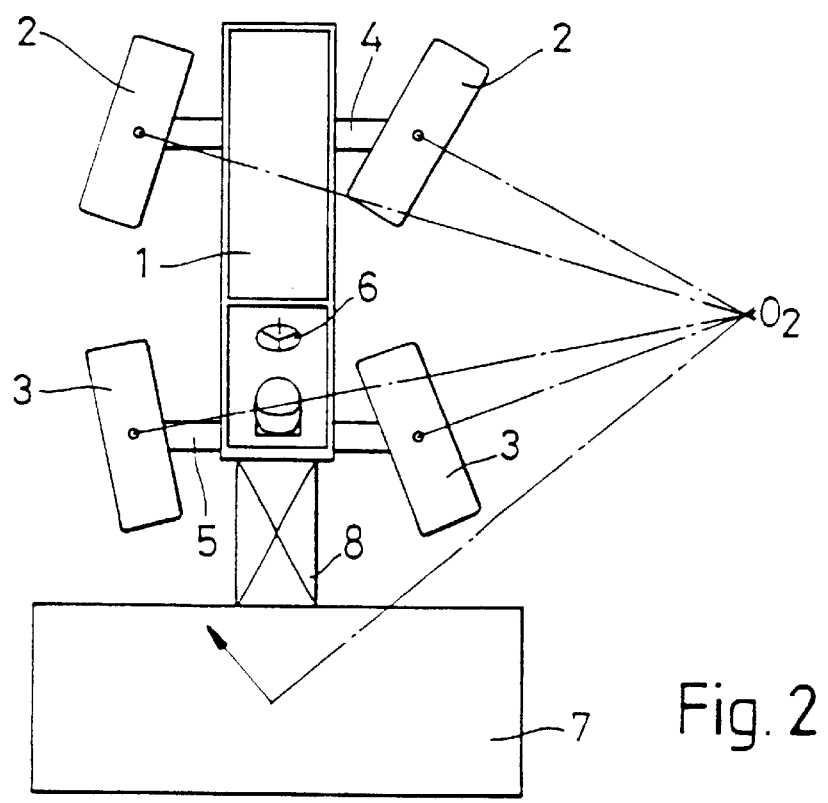

FIG. 2 illustrates four wheel "co-ordinated steer". The front axle 4 turns its wheels 2 to the right and the rear axle 5 its wheels 3 the same amount to the left and vice versa. This gives a smaller turning circle centered at $O_2$ for the same amount of turn of the steering wheel 6 and the advantage that front and rear wheels 2 and 3 travel the same path to minimise crop damage. But there is instability at speed and a large sideways force on the implement 7. In FIG. 5, the chain dotted line (with single dots) illustrates the relationship between front and rear wheels in this mode.

Figure 3:
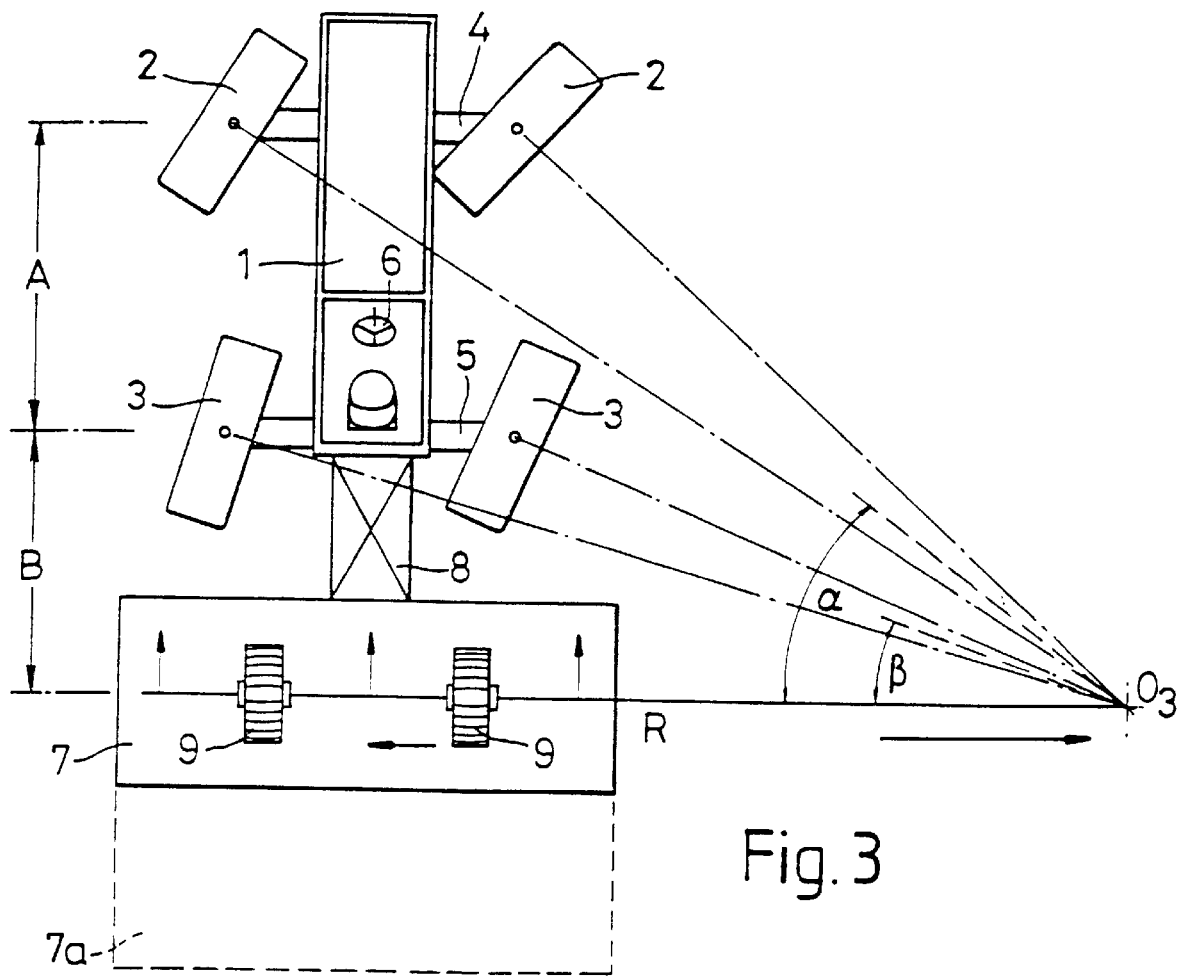

FIG. 3 shows four wheel "programmed steer". Both axles turn their wheels 2 and 3 to the right (or left) to different extents allowing the machine to move "sideways", but in an arc of a circle centered at $O_3$. This is on a line transversely through the working part of the implement 7, thus avoiding significant sideways forces on it.

With the front wheels 2 turned through a mean angle α the mean steering angle β of the rear wheels is determined as follows:

$$\text{Turning radius } R = \frac{A+B}{\tan \alpha} \text{ and Tan } \beta = \frac{B}{R}$$

$$\text{So Tan } \beta = \frac{B \times \tan \alpha}{A+B}$$

Programmed control means can calculate the angle β from the inputs α, A and B and the rear wheels can be steered accordingly.

This steering mode is normally selected when the vehicle speed is below 10 kph and the implement is engaging or partially in the ground. In FIG. 5, the chain dotted line (with double dots) illustrates the relationship between the front and rear wheels in this mode and it will be understood that, with different values of A and B it is not always at the particular slope shown.

In practice, with an Ackerman steering linkage, errors (steering fight) may be created due to the linkage to the rear axle being optimised for only one of the steering modes (the four wheel co-ordinated steer of FIG. 2). However, since the steering angles when operating in the "programmed steer model" of FIG. 3 are generally small this should be satisfactory for general agricultural use. In more critical situations independent sensing and control for each vehicle wheel may be necessary.

Steering correction turns may be made with the implement in work, and stress on the vehicle/implement interface is minimised to the extent that the linkage 8 can be laterally rigid. This is indicated by showing diagonal links in addition to the longitudinal ones. Such a linkage is simpler, lighter, stronger and more compact than a swinging linkage since there is no need to provide clearance for swinging. It also assists steering a straight path when cultivating succeeding strips in the field, and gives extra room for wide tires at a narrow track width, particularly when those tires are on steered wheels.

The system is capable of being adjusted to allow for different lengths of implement, drawbar and tractor wheel base, and an extended implement which will give a different value of B is indicated by broken lines 7a in FIG. 3. With a different tractor, another value of A would be input.

The system allows very large implements which would normally be trailed to be linkage mounted or rather semi-mounted as also indicated in FIG. 3. Previous semi-mounted implements suffer from the problem that the implement is raised partially by the tractor linkage and partially by hydraulically raised depth wheels 9. In a conventional semi-mounted combination the depth wheels are castor type, which suffer from a number of problems. In particular they require a large amount of room to twist and are inherently weaker than fixed wheels. The proposed system allows the use of depth control wheels 9 of fixed direction.

Figure 4:
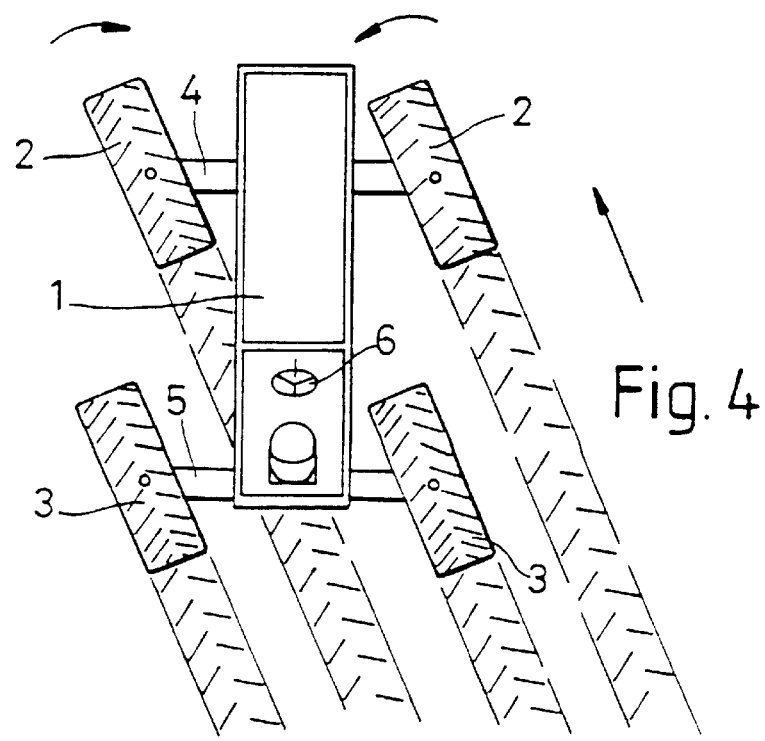

FIG. 4 illustrates guided "crab steer". The purpose of this mode is to reduce the damage caused by the passage of heavy machinery when travelling on soft ground. It may be used when lime spreading or slurry spreading, for example. Each wheel makes an individual track rather than the rear wheels 3 following in the tracks of the front wheels 2. Many specialist fertiliser broadcaster machines and slurry application machines are designed with a tricycle wheel formation in order to produce this result. However tricycle machines are inherently less stable than four wheeled machines and have other disadvantages. Generally, the rear wheels 3 will be set at a suitable angle skew to the vehicle chassis and the front wheels 2 are steered about a median position parallel to the rear wheels so that all four wheels follow separate paths. This mode can be programmed into the steering controller, but it does have a disadvantage in that, as can be seen from FIG. 4, steering lock in one direction is rather limited. However, the steering can be configured so that a major steering correction to the left will be actioned by the rear axle. This is illustrated by the full line characteristic in FIG. 5. The rear wheels are set at a 20° angle and the front wheels are steered normally over a limited arc about the same angle. But when the front wheel turns more than 10° either side of the 20° mean there is a changeover to bring in rear wheel steering as well.

The steering system may be arranged so that it changes to a different mode depending on the application.

For example the tractor could revert from co-ordinated or programmed steering to a two wheel steer as in FIG. 1 above a pre-set speed. This would put the implement/tractor combination into the most stable and safe mode for high speed transport. It could be arranged that, when the speed falls again it remains in two wheel steer mode unless there is positive driver action to change it. Thus temporary slowing down on a public road will not suddenly and possibly dangerously change the steering characteristic.

The system may also be readily adjusted to allow for the use of front mounted implements, although implements mounted on the front and the rear will not generally operate simultaneously.

Figure 6:
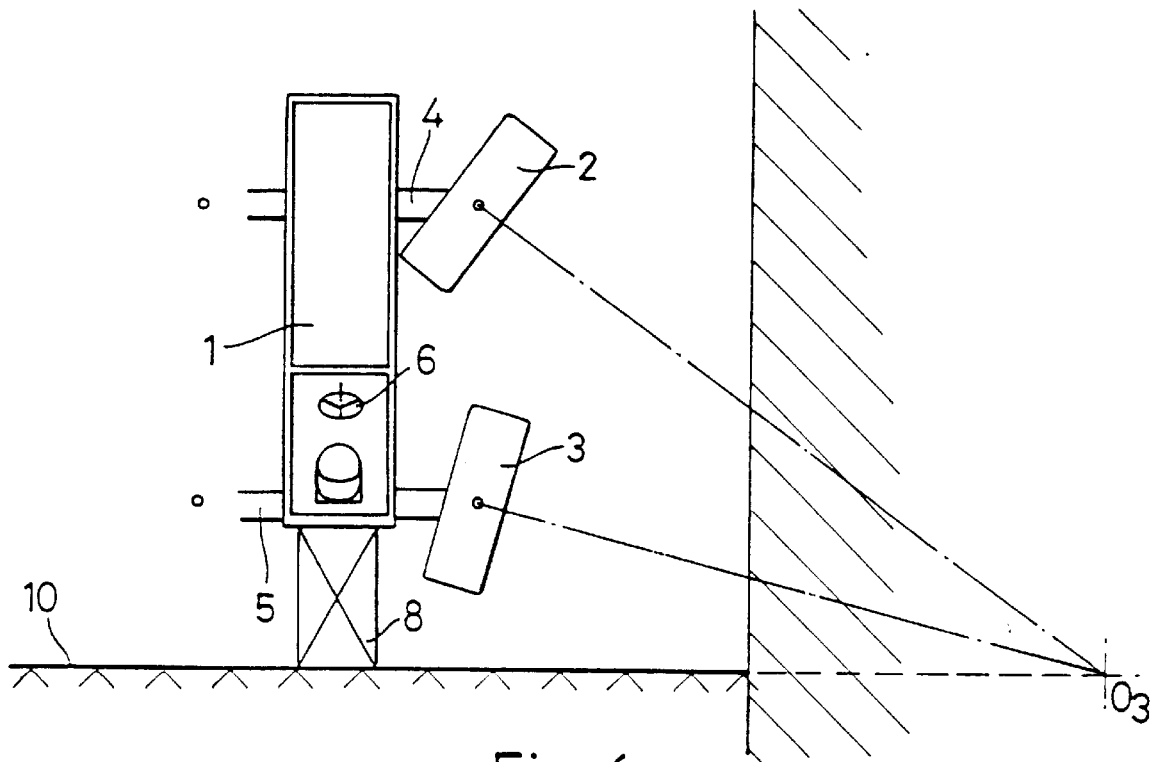
FIGS. 6 and 7 are diagrammatic plan views of a four wheeled tractor respectively carrying a spray boom and towing a trailer.

The steering system may be employed for uses other than cultivation equipment. For example it will allow improved control of wide rear mounted equipment such as a spray boom 10 as shown in FIG. 6. The shaded area indicates ground already sprayed. It is impossible with current two wheel steer or four wheel co-ordinated steer systems to make accurate steering corrections without over or under spray. It is easier with the present system in programmed steer mode and the centre of turn $O_3$ on the line of the boom 10 to follow an optimum path since the implement moves only in the direction of steering correction. But over a central arc of say 20° as indicated by the dotted line in FIG. 5, normal two wheel steer may be quite adequate, while if front wheel turns of more than 10° from the centered position are needed, there will be an automatic changeover to programmed steer.

Figure 7:
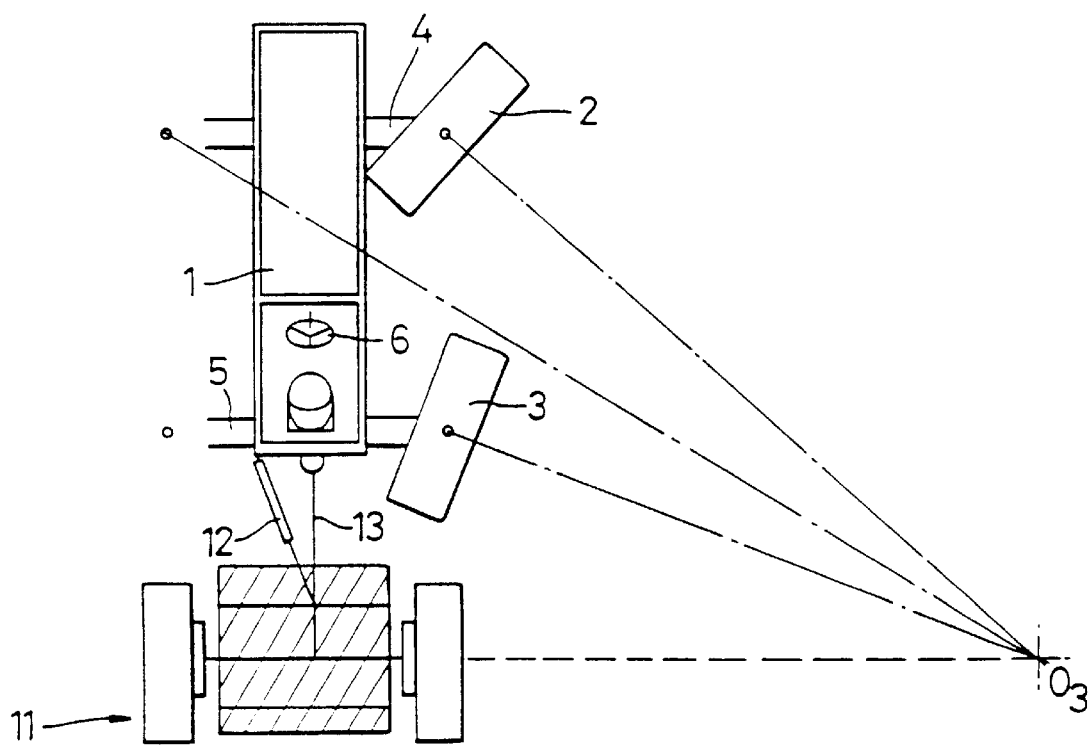

The system may also be used with trailed equipment 11, which allows the tractor always to have a straight pull even on corners as shown in FIG. 7. It will work in this mode without modification as long as the wheelbase inputs are correct. An overriding correction sensor 12 may be fitted between the drawbar 13 and the rear of the tractor 1 to adjust the rear wheels 3 so that the drawbar is kept in a straight line. This system will also work when reversing trailed equipment, and it makes reversing much easier.

Figure 8:
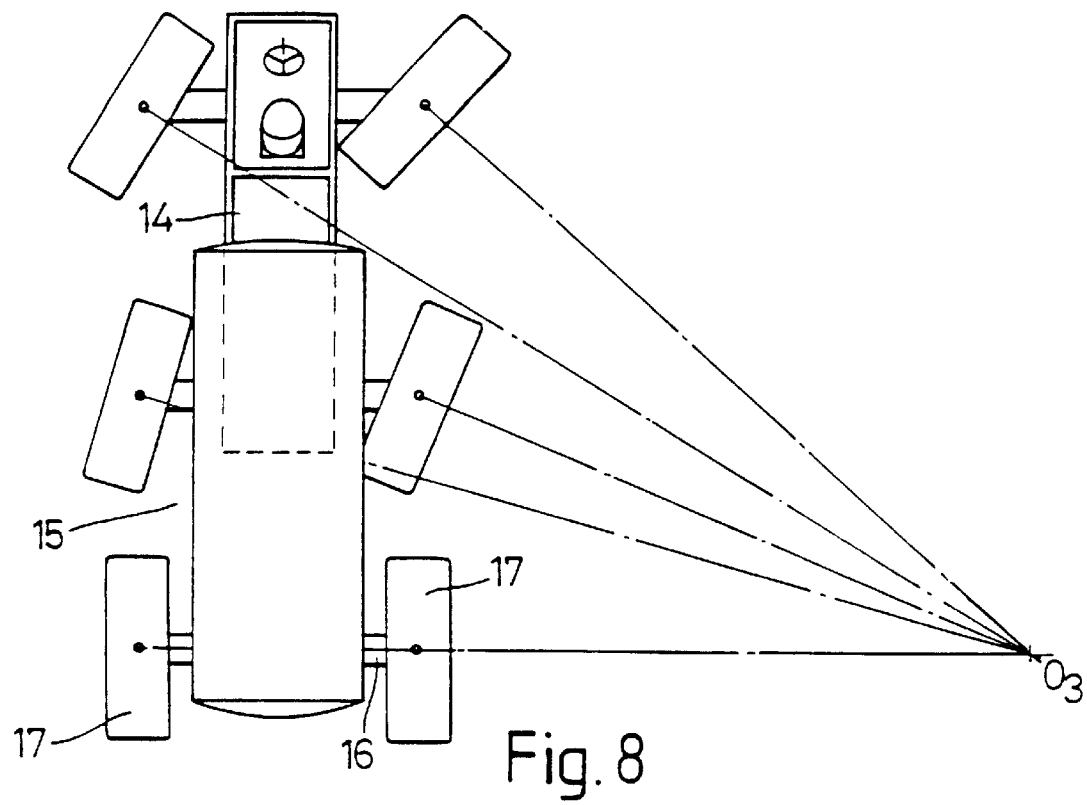
FIGS. 8 and 9 are diagrammatic plan views of other tractor combinations.

The system may also be employed with advantage on a vehicle with more than two axles so that the vehicle could be steered without scuffing of the tires on the third axle, as illustrated in FIG. 8, which shows a vehicle 14 having a short wheel base for compactness and manoeuvrability part-carrying a long skid mounted unit 15, such as a large tanker or trailer unit, the remainder of whose weight is carried on a third trailing or driven axle 16 mounted behind the normal rear axle of the vehicle. By operating laden in the "programmed steer" mode the vehicle can be steered without scuffing or damage to the rear tires 17. Optionally it may be arranged to "lift" the third axle 16 clear of the ground when the tanker or trailer unit 15 is empty and then revert to four wheel "co-ordinated steer" mode for greater manoeuvrability.

Figure 9:
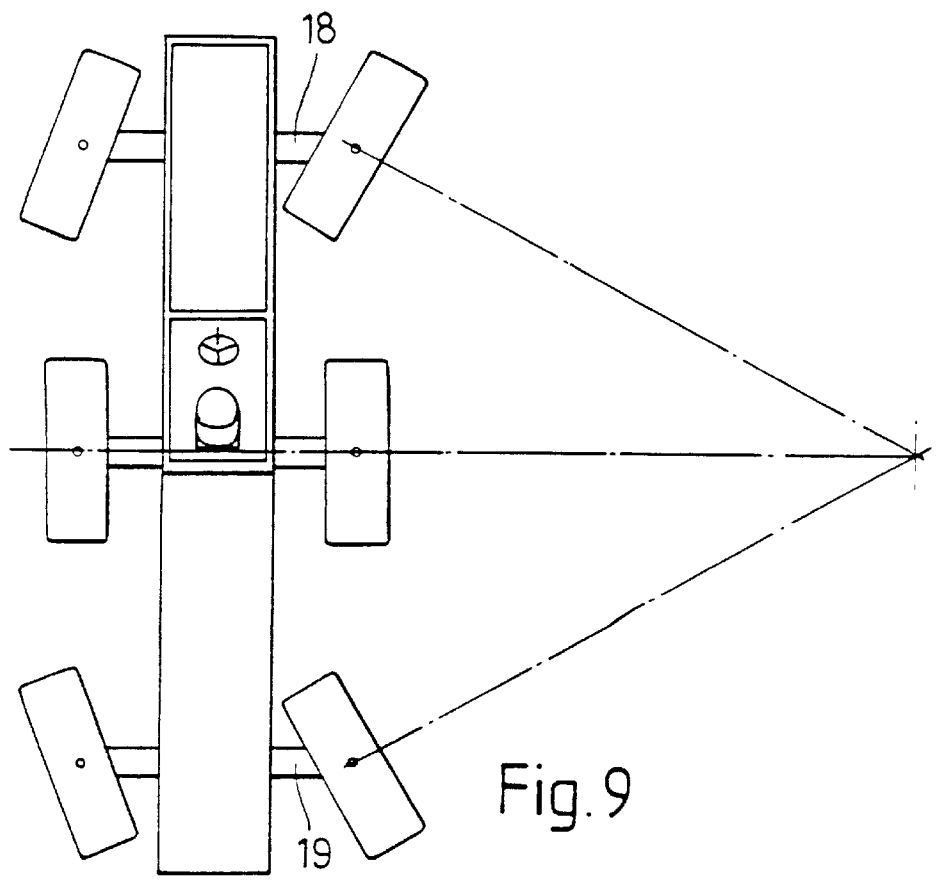

The system may also be used to control more than one slave axle to reduce the turning circle of multi-axled units as shown in FIG. 9. Where three axles are used, the system may be used just on the leading and trailing axles 18 and 19 to reduce the turning circle. However in order to enjoy the full benefits of the system, all axles should be controlled, and this especially applies to vehicles with more than three axles. Multiple units may be slaved to additional axles.

Figure 10:
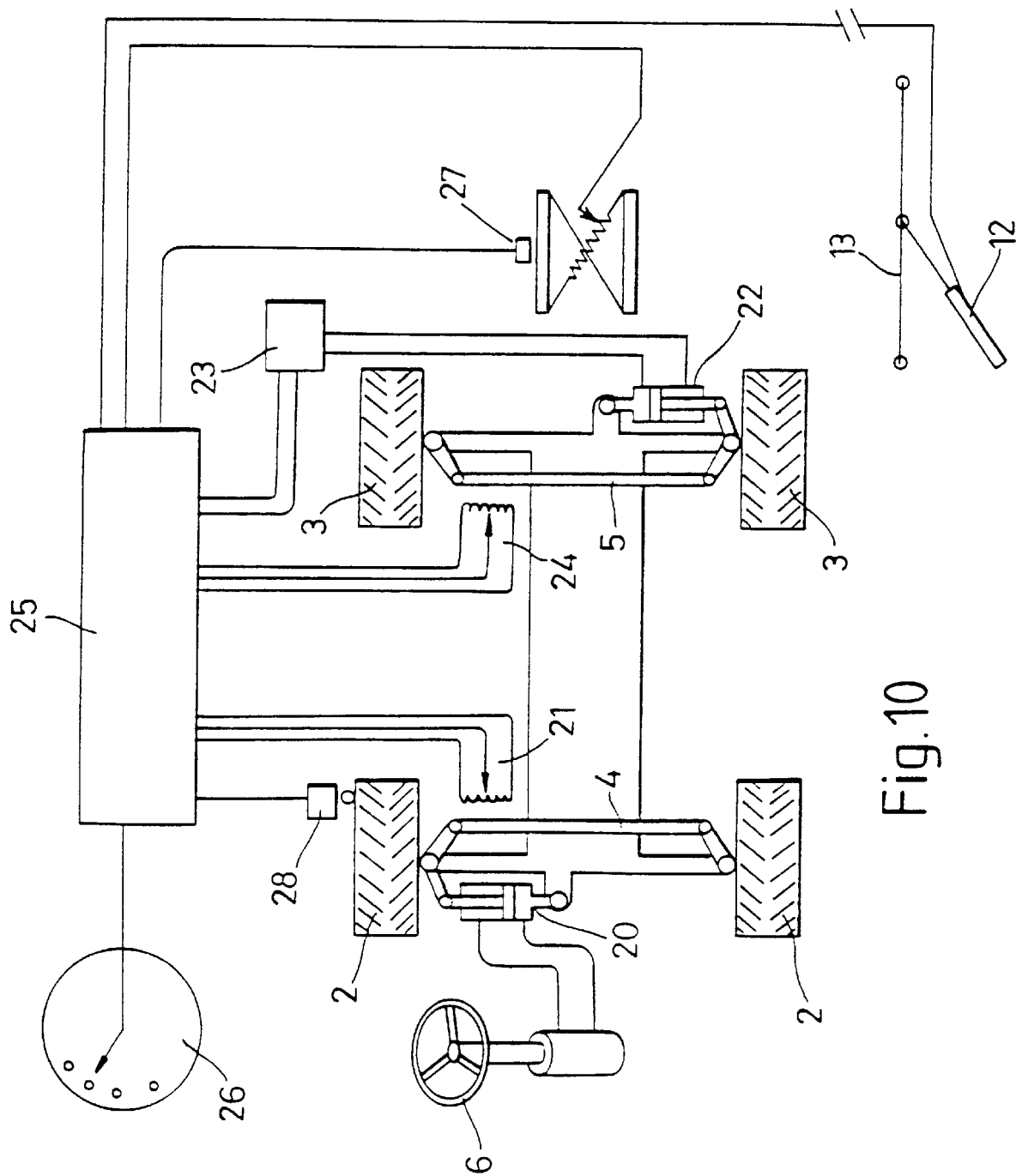
FIG. 10 is a diagram of the steering control system of a tractor.

The operation of the system will now be described with reference to FIG. 10.

The vehicle front axle 2 is steered using conventional hydrostatic power steering 20, controlled directly by the driver through the steering wheel 6. A potentiometer 21 or other position indicating device senses the current mean steering angle $\alpha$ of the axle 4, giving an electric output in proportion to that angle. The rear axle 5 is also steered hydraulically by actuator 22 which is controlled by an electrically operated proportional hydraulic valve 23. The steering angle $\beta$ of this axle is also sensed by a potentiometer 24 or other device.

A programmable electronic control unit 25 controls the movements of the rear axle 5 to give the required steering effect as explained above. Its inputs are as follows:

(i) Wheel base A of the tractor.
(ii) Distance B from tractor rear axle to centre of draught axis of the implement. This will be operator adjustable for different implement sizes.
(iii) Front axle mean steering angle $\alpha$ from device 21.
(iv) Rear axle mean steering angle $\beta$ from device 24.
(v) Steering mode from selection switch 26.
(vi) From a switch 27 which indicates whether implement 7 (or 10) is idle or working. For soil engaging implements this will normally be an implement position sensor, while for spread/spray implements it will normally be an actuation switch. For harvesting implements running above ground it will often be a height sensor.
(vii) Speed from a forward speed sensor 28.
(viii) (Optional) From a drawbar sensor 12 to allow use with trailed units to sense that the tractor and trailer are in a straight line and, if not, to correct the steering angle. This input can also be used to control mounted implements by equipping the linkage with a differential strain gauge to sense that the tractor is pulling the implement in a straight line.

Using (i), (ii) & (iii), the control unit 25 determines the required mean steering angle $\beta$ on the rear axle.

This is compared with the actual angle $\beta$ as indicated by device 24 and, if a correction is required, an output signal is sent to the proportional hydraulic valve 23. The rear axle 5 is thus controlled by actuator 22 until it reaches the required steering angle. The process is continuous whilst the implement is in work.

The inputs (vi), (vii) & (viii) determine the mode of operation most appropriate for the circumstances.

The switch 27 is operated to give signal (vi) when the implement is raised out of work (at the end of a field or at an obstacle). This can over-ride the selector 26 and automatically change the steering mode to a more suitable one, for example from "programmed" to "co-ordinated" steer, or it could alert the operator to choose another using the selector 26. Lowering the implement could automatically cause the steering mode to revert to the original one. The signal (vii) from the speed sensor 28 will allow the steering control unit 25 to select a suitable mode for higher speeds and road work.

The steering system can also use feedback to control the steering whilst a linkage mounted implement is in work, or when the tractor is trailing an implement. The sensor 12 of FIG. 7, for example, could be a linear potentiometer, or contactless means such as a pair of proximity sensors, which senses the drawbar angle and sends a signal to the control unit 25. This then makes a correction to the rear steering angle β to reduce the strain or deviation to a minimum.

With an implement carried by a linkage 8, the links can be fitted with strain gauges to sense that the implement is being pulled in a straight line. When any twisting of the linkage is detected the strain gauges send a signal to the control unit which corrects the rear wheel steering in order to minimise strain.

It is envisaged that this form of control could replace the uses of steering sensors, but it is more likely to be useful as an addition to the system when using implements which generate side thrust, such as mouldboard ploughs for example, or when using implements on side slopes. In these situations the controller will use the feedback signals to monitor the situation and if necessary use the feedback signals for fine adjustment of the steering.

In any mode, the driver will be able to over-ride the control unit 25, and steer the rear wheels through the valve 23.

Figure 11:
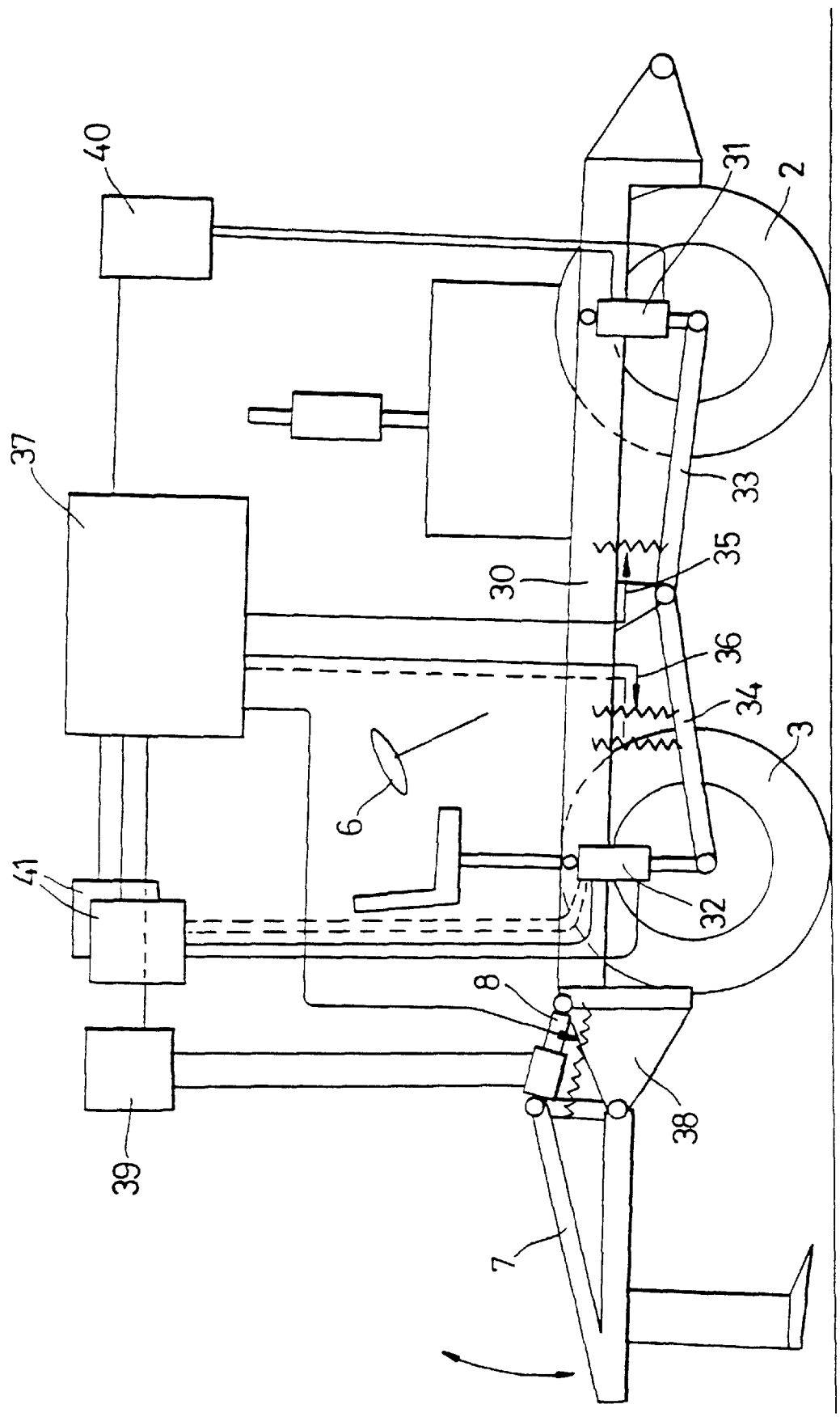
FIG. 11 is a diagram of a suspension system.

Referring to FIG. 11, this shows in very diagrammatic form a possible adjustable suspension arrangement which could be provided in conjunction with the steering system described, and which would capitalize on it.

The chassis 30 is carried on the wheels 2 and 3 through hydraulic rams 31 and 32 acting vertically between the ends of swinging links 33 and 34 whose position in relation to the chassis is monitored by sensors 35 and 36. This information is fed to a control unit 37.

The implement 7 is pivotally attached to a bracket 38 fixed to the chassis 30 and can be tilted as indicated by the arrows through the linkage 8, which comprises a hydraulic actuator. There is provision for an implement at the front as well. The hydraulic devices 8, 31 and 32 are adjustable from the control unit through electro-hydraulic valves 39, 40 and 41. There are two such valves 41, associated respectively with rams 32 on opposite sides of the chassis 30 to tilt the vehicle sideways if necessary or keep it level on sloping ground. There could also be two valves 40.

The implement 7 is raised in and out of work by adjustment of the vehicle ride height, using the rams 31 and 32. For transport, the actuator 8 pivots the implement 7 up. In some circumstances, there need be no actuator, and the implement could be completely rigid with the chassis.

Even with the actuator 8, this arrangement offers very rigid implement mounting, with any power drive shaft at a constant angle, which could be initially a straight line. Thus driveline stress and torsional vibrations will be minimised.

I claim:

1. A vehicle with at least front and rear wheel pairs (2, 3) steering means (20, 22) for the front pair and the rear pair, means (8) for hitching or carrying an implement (7) at one end of the vehicle, a steering wheel (6), and electronic control means (25) arranged to influence the effect of the steering wheel (6) on the steering means, the control means (25) being switchable into any of a plurality of modes including:

(i) front or rear wheel steering, with a passive, non-steered pair held in a fixed alignment parallel with the longitudinal direction of the vehicle, (ii) co-ordinated steering in which the front and rear pairs turn in opposite directions when the steering wheel (6) is operated so that the trailing pair (3) tracks the leading pair (2), (iii) crab steering in which a passive, non-steered pair is set skew to the longitudinal direction of the vehicle and the other pair is steered about a median position parallel to the set of the passive pair, and (iv) programmed steering in which the front and rear pairs turn to the same side of longitudinal direction, but to different extents, when the steering wheel (6) is operated, such that the centre of turn of the vehicle is on a line transversely through the working portion of the implement, and in that the control means (25) is programmable to govern the response of the steering means to the turning of the steering wheel according to data on the vehicle and the implement attached thereto.

2. A vehicle as claimed in claim 1, characterised in that in crab steering the steered pair is in sole control of steering over a limited arc spanning the median position, but, when that limit is exceeded, the control means (25) cause the hitherto passive pair to be steered, augmenting the steering action of the primary steered pair.

3. A vehicle as claimed in claim 1, characterised in that the control means (25) are arranged to change modes of steering from one mode to another in response to vehicle/implement conditions.

4. A vehicle as claimed in claim 3, characterised in that the control means (25) are arranged to change the steering from mode (ii) to mode (i) and mode (iv) to mode (i) when the vehicle attains a predetermined speed.

5. A vehicle as claimed in claim 4, characterised in that the control means (25) are arranged to maintain the steering in mode (i) if the speed then falls below the predetermined level.

6. A vehicle as claimed in claim 3, characterised in that the control means (25) are arranged to change the steering from mode (iv) to mode (ii) when the implement (7) is taken out of use.

7. A vehicle as claimed in claim 6, characterised in that the control means (25) are arranged to change the steering back from mode (ii) to mode (iv) when the implement (7) is put back into use.

8. A vehicle as claimed in claim 3, characterised in that the control means (25) are capable of operating the steering in a hybrid of modes (i) and (iv), mode (i) being operable over a central arc, but the steering changing to mode (iv) when the steered pair turn beyond that arc.

9. A vehicle as claimed in claim 1, characterised in that the normally passive non-steered pair are capable of being steered by a driver operated control working through the electronic control means (25) independently of the programmed modes.

* * * * *